United States Patent
Bartonek et al.

(10) Patent No.: US 10,012,546 B2
(45) Date of Patent: Jul. 3, 2018

(54) TEMPERATURE DETECTION SYSTEMS AND METHODS FOR RAILWAY APPLICATIONS

(71) Applicant: Progress Rail Services Corporation, Albertville, AL (US)

(72) Inventors: Mark Joseph Bartonek, Independence, MO (US); Donald J. Arndt, Napoleon, MO (US); Steven Conrad Hamerle, Richmond, MO (US)

(73) Assignee: Progress Rail Services Corporation, Albertville, AL (US)

( * ) Notice: Subject to any disclaimer, the term of this patent is extended or adjusted under 35 U.S.C. 154(b) by 311 days.

(21) Appl. No.: 14/923,085

(22) Filed: Oct. 26, 2015

(65) Prior Publication Data

US 2017/0115166 A1   Apr. 27, 2017

(51) Int. Cl.
*G01J 5/02* (2006.01)
*G01J 5/10* (2006.01)
*B61K 9/08* (2006.01)
*B61K 9/04* (2006.01)
*G01J 5/00* (2006.01)

(52) U.S. Cl.
CPC ............. *G01J 5/10* (2013.01); *B61K 9/04* (2013.01); *B61K 9/08* (2013.01); *G01J 5/025* (2013.01); *G01J 2005/0077* (2013.01); *G01J 2005/0085* (2013.01)

(58) Field of Classification Search
CPC .... G01J 5/10; G01J 5/025; B61K 9/04; B61K 9/08

USPC .......................................................... 250/340
See application file for complete search history.

(56) References Cited

U.S. PATENT DOCUMENTS

| | | | |
|---|---|---|---|
| 4,062,214 A * | 12/1977 | Mentzel | B21C 51/00 250/239 |
| 5,448,072 A | 9/1995 | Gallagher | |
| 5,677,533 A | 10/1997 | Yaktine et al. | |
| 7,507,965 B2 | 3/2009 | Lane et al. | |
| 7,752,015 B2 | 7/2010 | Church et al. | |
| 8,335,606 B2 | 12/2012 | Mian et al. | |
| 8,622,351 B2 * | 1/2014 | Hesser | B61K 9/06 246/169 A |
| 2009/0173839 A1 * | 7/2009 | Groeneweg | B61L 23/042 246/15 |
| 2014/0321501 A1 * | 10/2014 | Bartonek | G01J 5/0809 374/121 |

* cited by examiner

*Primary Examiner* — David Porta
*Assistant Examiner* — Abra Fein
(74) *Attorney, Agent, or Firm* — Miller, Matthias & Hull

(57) ABSTRACT

A temperature detection system for railway applications is provided. The system may include at least one infrared (IR) sensing element configured to detect IR signals emitted by a rail or a railcar, and a controller in communication with the at least one IR sensing element. The controller may be configured to receive the IR signals from the at least one IR sensing element, extract IR data corresponding to at least one of a rail and an undercarriage of the railcar from the IR signals, and generate a characteristic thermal profile of at least one of an ambient temperature and a rail temperature based on the IR data.

18 Claims, 4 Drawing Sheets

TEMPERATURE DETECTION SYSTEMS AND METHODS FOR RAILWAY APPLICATIONS

TECHNICAL FIELD

The present disclosure relates generally to temperature detection systems associated with trains or railcars, and more particularly, to systems and methods for detecting ambient temperatures or rail temperatures.

BACKGROUND

The optimum operating speed of a train may be determined based on a combination of different factors, such as the operating parameters of the train itself, as well as conditions associated with the railway or other environmental conditions that are external to the train. Among these factors, the ambient and rail temperatures can be important parameters to monitor due to their influence on the maximum operating speed of the train and the condition of the railway. Specifically, normal operating speeds may be unsafe or too high in harsh weather conditions or in extreme ambient temperatures. Rails or railroad tracks can also cause derailments under extreme temperatures, for example, become brittle and weak in extremely cold temperatures, or expand and cause kinks in extremely hot temperatures. Accordingly, ambient and rail temperatures may need to be continuously monitored, and the train speed may need to be continuously adjusted in accordance with those changes to ensure optimum but safe operating speeds throughout a given route.

While a variety of different temperature monitoring solutions may be conventionally available for use in the railroad industry, each solution has various drawbacks and poses significant challenges. One possible solution relies on temperature contact probes that are installed into the rails of a railway. These temperature probes, however, are installed within holes that must be drilled into the rails, which may weaken the structural integrity of the rails or cause other concerns. Wayside temperature monitoring instruments have also been used to avoid drilling into the rails. However, such wayside equipment are often exposed to rain or snow, or enclosed in housings that over-insulate the sensing mechanisms from the environment, thereby rendering temperature readings inaccurate or unreliable.

Other conventional temperature monitoring solutions, such as those based on infrared (IR) scanners, are also available. For example, U.S. Pat. No. 5,448,072 ("Gallagher") discloses a detection system which uses two IR scanners to monitor temperatures in a railroad application. However, the system in Gallagher, much like other IR-based temperature detection systems, are not configured to monitor or determine ambient or rail temperatures. As shown in FIG. 2 of Gallagher, for instance, the IR scanners 26, 28 are housed and positioned on the wayside, and specifically aimed only at the wheels and bearings of the train. While Gallagher does not measure ambient or rail temperatures, the IR scanners 26, 28 are also susceptible to all of the drawbacks associated with wayside equipment noted above.

The present disclosure is directed at addressing one or more of the deficiencies and disadvantages set forth above. However, it should be appreciated that the solution of any particular problem is not a limitation on the scope of this disclosure or of the attached claims except to the extent express noted.

SUMMARY OF THE DISCLOSURE

In one aspect of the present disclosure, a system for detecting temperature is provided. The system may include at least one infrared (IR) sensing element configured to detect IR signals emitted by a rail, and a controller in communication with the at least one IR sensing element. The controller may be configured to receive the IR signals from the at least one IR sensing element, extract IR data corresponding to the rail from the IR signals, and generate a characteristic thermal profile of a rail temperature based on the IR data.

In another aspect of the present disclosure, a system for detecting temperature is provided. The system may include at least one infrared (IR) sensing element configured to detect IR signals emitted by a railcar, and a controller in communication with the at least one IR sensing element. The controller may be configured to receive the IR signals from the at least one IR sensing element, extract IR data corresponding to an undercarriage of the railcar from the IR signals, and generate a characteristic thermal profile of an ambient temperature based on the IR data.

In another aspect of the present disclosure, a controller for detecting temperature is provided. The controller may include a sensor module configured to receive one or more IR signals emitted by a railcar using at least one IR sensing element, a signal processing module configured to extract IR data corresponding to at least one of a rail and an undercarriage of the railcar from the IR signals, and a profile module configured to generate a characteristic thermal profile of at least one of an ambient temperature and a rail temperature based on the IR data.

In yet another aspect of the present disclosure, a controller-implemented method for detecting temperature is provided. The controller-implemented method may include receiving, at one or more IR sensing elements, one or more IR signals emitted by a railcar; extracting IR data corresponding to at least one of a rail and an undercarriage of the railcar from the IR signals; and generating a characteristic thermal profile of at least one of an ambient temperature and a rail temperature based on the IR data.

DETAILED DESCRIPTION

Figure 1:
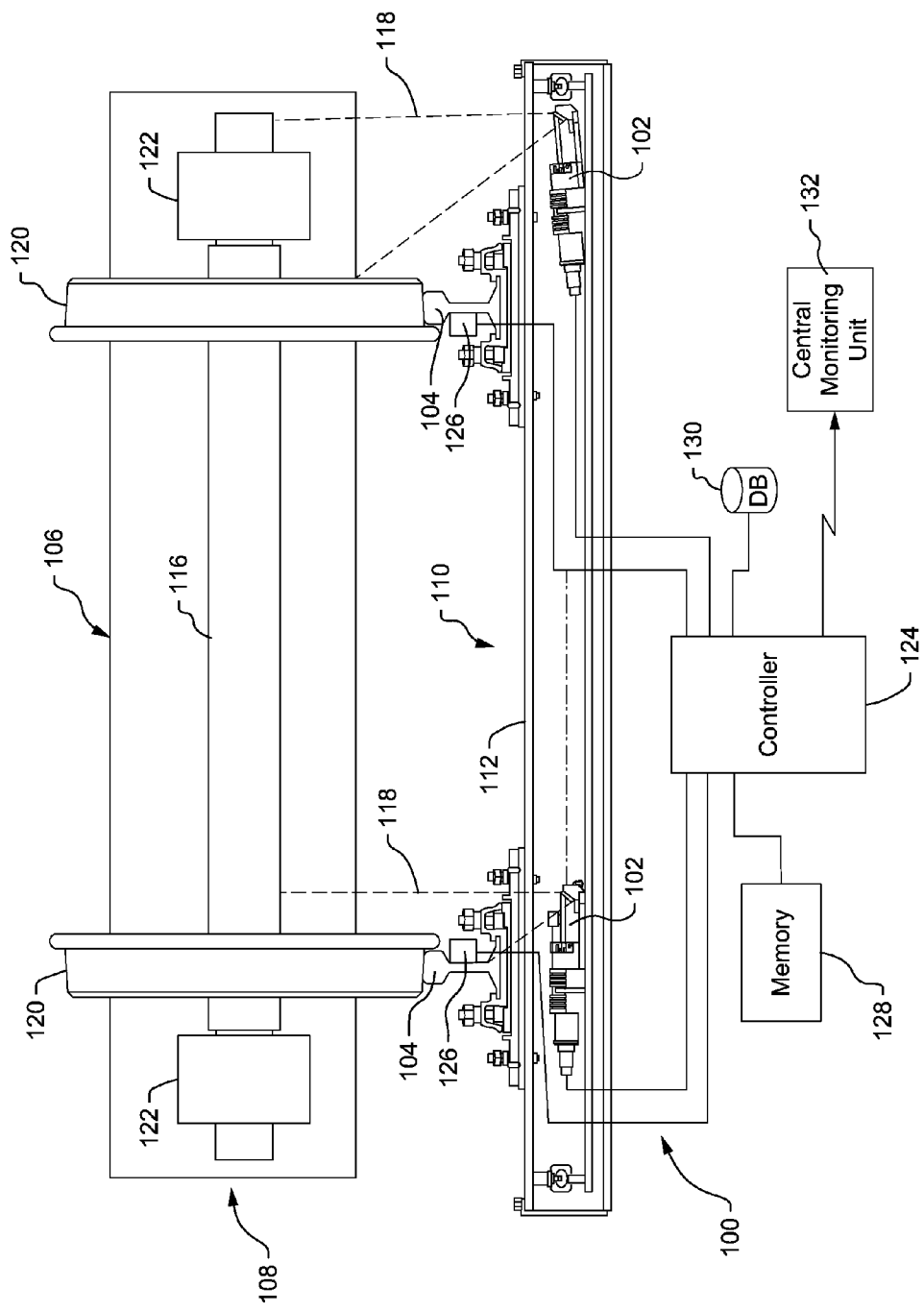
FIG. 1 is a schematic illustration of an exemplary ambient and/or rail temperature detection system of the present disclosure.

Referring now to FIG. 1, one exemplary temperature detection system 100 that may be used to detect ambient and/or rail temperatures is provided. As shown, the temperature detection system 100 may include one or more sensing elements 102 that may be disposed along a rail 104 and positioned in a manner that enables the sensing elements 102 to obtain temperature data from the rail 104, the undercarriage 106 of a passing train or railcar 108, or any other relevant target area that can be indicative of, or used to derive, ambient temperatures and/or rail temperatures. Each sensing element 102 may be implemented using an infrared (IR) camera, or any other device having one or more microbolometer arrays, planar arrays with individually resolvable pixels, and the like, configured to receive IR radiation or signals emitted from the rail 104 or its vicinity. For example, the sensing elements 102 may incorporate thermal detectors, photonic detectors, or any other IR detector capable of detecting changes in the electrical resistance of the material of the temperature sensors, changes in physical characteristics of the temperature sensors, excitation of electrons in the sensors caused by impingement of photons on the sensors, and the like.

As shown in FIG. 1, the sensing elements 102 may be positioned on, adjacent to or otherwise proximate to a rail bed 110 of the rail 104, such as on a cross-tie or sleeper 112 adapted to contain or hold the sensing elements 102, and the like. Alternatively or additionally, the sensing elements 102 may be clamped to the rail 104, or otherwise mounted in proximity thereto, and aimed substantially parallel to the rail 104, or positioned in any other orientation that optimizes the ability of the sensing elements 102 to receive IR radiation or signals being emitted from the relevant target areas. Furthermore, the sensing elements 102 may be positioned to receive IR signals emitted from a target area 118 that is generally parallel to the rail 104. Additionally, the target area 118 may be adjusted, such as widened or narrowed, as desired for a given application to capture IR emissions from, for example, any one or more of the rail 104, undercarriage 106, train axle 116, wheels 120, bearings 122, and the like. In other alternatives, the sensing elements 102 may employ mirrors, lenses, or other optical components arranged to redirect the relevant IR signals to the sensing elements 102, which may allow the sensing elements 102 to be installed in other convenient orientations or locations.

In addition to the sensing elements 102, temperature detection system 100 of FIG. 1 may further include and/or employ a controller 124, proximity sensors 126, a memory 128, a database 130, a central monitoring unit 132, and any other device or component that may be used for the purposes of monitoring ambient temperatures and/or rail temperatures. Moreover, the controller 124 may communicate directly or indirectly with each of the sensing elements 102, proximity sensors 126, memory 128, database 130 and the central monitoring unit 132 in a manner configured to, for example, receive the IR signals detected by the sensing elements 102, process the IR signals so as to extract IR data corresponding to the undercarriage 106 of the railcar 108 or the rail 104, and generate a characteristic thermal profile that can be used to differentiate between corresponding ambient temperatures and/or rail temperatures. The controller 124 may be implemented, for example, using any one or more of a processor, a microprocessor, a microcontroller, a field programmable gate array (FPGA), a programmable read-only memory (PROM), or any other programmable device that is capable of monitoring ambient temperatures and rail temperatures in accordance with preprogrammed instructions and/or algorithms. Although the temperature detection system 100 in FIG. 1 is shown with a single controller 124, it will be understood that any suitable arrangement of two or more controllers 124 may also be implemented to collectively produce comparable results. Furthermore, each of the sensing elements 102 may include individual controllers 124 that are configured to perform one or more of the processes identified herein.

Still referring to FIG. 1, one or more of the controller 124, proximity sensors 126, memory 128, database 130 and central monitoring unit 132 of the temperature detection system 100 may be locally disposed relative to the rails 104, such as within the sleeper 112, or remotely disposed relative to the rails 104, such as within wayside housings, or the like. In particular, the proximity sensors 126 may be disposed proximate to the rails 104 and configured to indicate to the controller 124 when a train or railcar 108 is approaching, passing, or otherwise in the vicinity of the sensing elements 102, and when the sensing elements 102 should begin and/or cease monitoring temperature. For example, the proximity sensors 126 may employ inductive sensors, or any other sensing mechanism configured to detect or determine when the wheels 120 of a train or railcar 108 are passing by. If the readings provided by the proximity sensors 126 indicate that a train or railcar 108 is approaching or passing, the controller 124 may begin or continue receiving temperature information from the sensing elements 102. However, if the proximity sensors 126 indicate that a train or railcar 108 has already passed by for some predefined duration and/or is not expected to pass any time soon, the controller 124 may cease monitoring temperature.

The memory 128 in FIG. 1 may be locally disposed relative to the controller 124 and configured to provide the controller 124 with any predefined reference information that may aid the controller 124 in processing IR data and in generating a characteristic thermal profile that can be used to determine ambient temperatures or rail temperatures. A characteristic thermal profile may include an arrangement of data which helps identify boundaries of a target area 118 and provide one or more temperature traits of target objects that can be electronically generated, processed, stored, communicated, or the like. In an embodiment in which the IR sensing elements 102 provide thermal images, such as in the form of lines of scanned data, for example, the controller 124 may refer to predefined information stored in the memory 128 to determine which of those line scans correspond to the target objects, such as the undercarriage 106 and the rail 104, and ultimately generate the characteristic thermal profiles based thereon. Moreover, the controller 124 may be able to identify the undercarriage 106 and/or the rail 104 based on predefined line locations and the temperatures sensed in associated with those lines or line locations. The controller 124 may additionally communicate with a database 130 which may be locally or remotely disposed relative to the controller 124. For example, the database 130 may include reference information which enables identification of each passing train or railcar 108 based on the relative axle count per railcar 108, the relative positions of the detected axles 116 or wheels 120 per railcar 108, or the like. Such reference information may be downloaded via one or more networks to which the controller 124 is connected.

Figure 2:
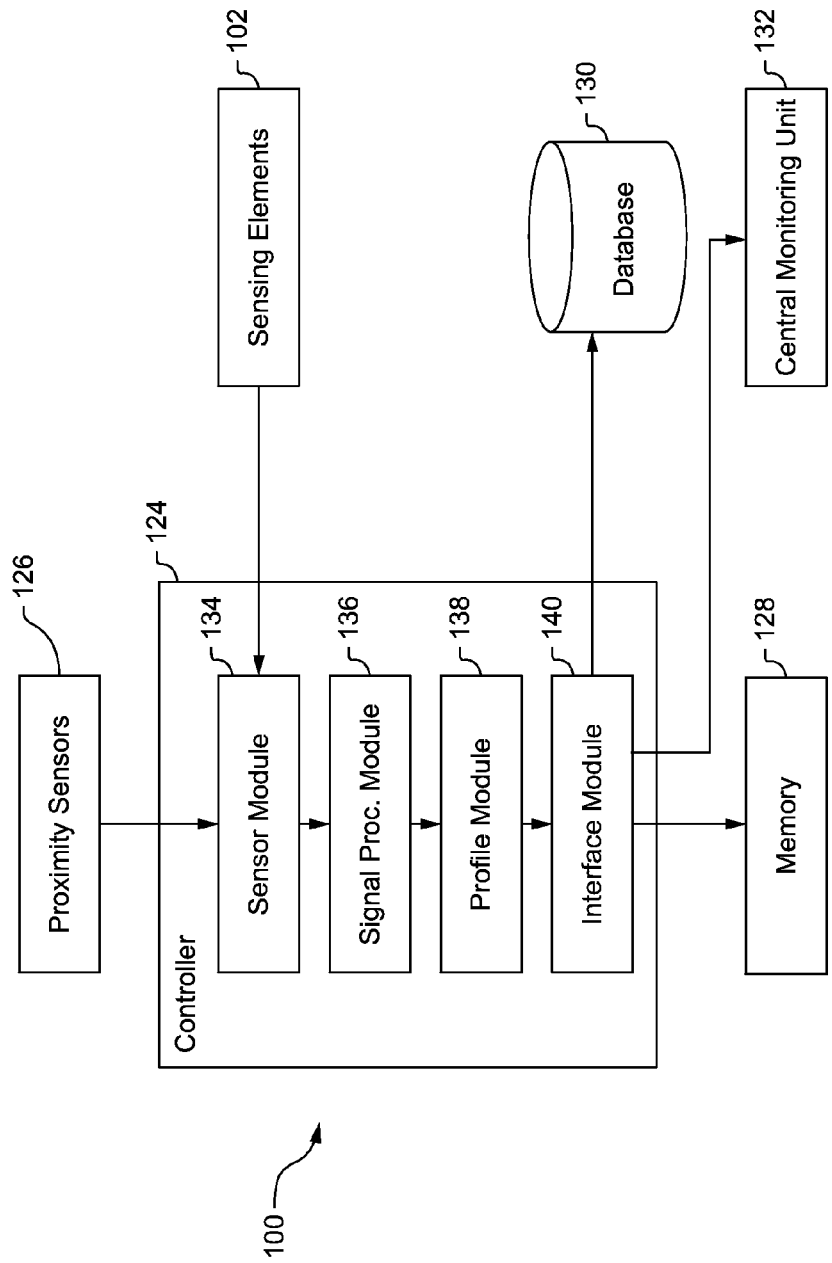
FIG. 2 is a diagrammatic illustration of an exemplary controller that may be used by the temperature detection system of FIG. 1.

Turning to FIG. 2, one exemplary embodiment of a controller 124 that may be used in conjunction with the temperature detection system 100 is provided. For example, the controller 124 may be preprogrammed according to one or more algorithms generally categorized into a sensor module 134, a signal processing module 136, a profile module 138, and an interface module 140. The sensor module 134 may electrically communicate with one or more sensing elements 102, such as IR cameras, or the like, that are configured to detect and receive IR radiation or signals emitted from underneath a passing railcar 108 for determining ambient temperatures and/or IR radiation or signals emitted from a rail 104 for determining rail temperatures. In the embodiment of FIG. 1, for example, the sensing elements 102 may be positioned in a manner configured to receive IR signals from any one or more of the undercarriage 106, the axles 116, the wheels 120, the bearings 122, and any other component of the railcar 108 that may pass through the target area 118 of the sensing elements 102. Furthermore, the sensor module 134 may communicate with one or more proximity sensors 126 configured to selectively enable the sensor module 134 according to when a train or railcar 108 is approaching, passing, or otherwise in the vicinity of the sensing elements 102.

Based on the IR signals received via the sensing elements 102, the sensor module 134 of FIG. 2 may provide corresponding IR data, such as line scans or lines of scanned graphical data, to the signal processing module 136 for further processing. The IR data may include digital bits or samples corresponding to, for example, the IR signals received through the target area 118, such as IR radiation that was emitted from underneath the railcar 108 and/or from the rail 104 while the sensor module 134 was enabled. Moreover, the input IR data that is received at the signal processing module 136 may be comprehensive and include temperature information for a variety of different components of the railcar 108. For instance, the IR data may capture not only temperatures of the undercarriage 106 and the rail 104, but also temperatures of the axles 116, the wheels 120, and the bearings 122. The signal processing module 136 may thus process the IR data in a manner which filters out the IR data corresponding to the axles 116, the wheels 120, and the bearings 122 of the railcar 108, and extract or isolate IR data specific to the undercarriage 106 or the rail 104. While other signal processing techniques may be used to provide similar results, the signal processing module 136 may be configured to filter out undesired IR signals and data based on a predefined threshold 142 as shown in FIG. 3.

Figure 3:
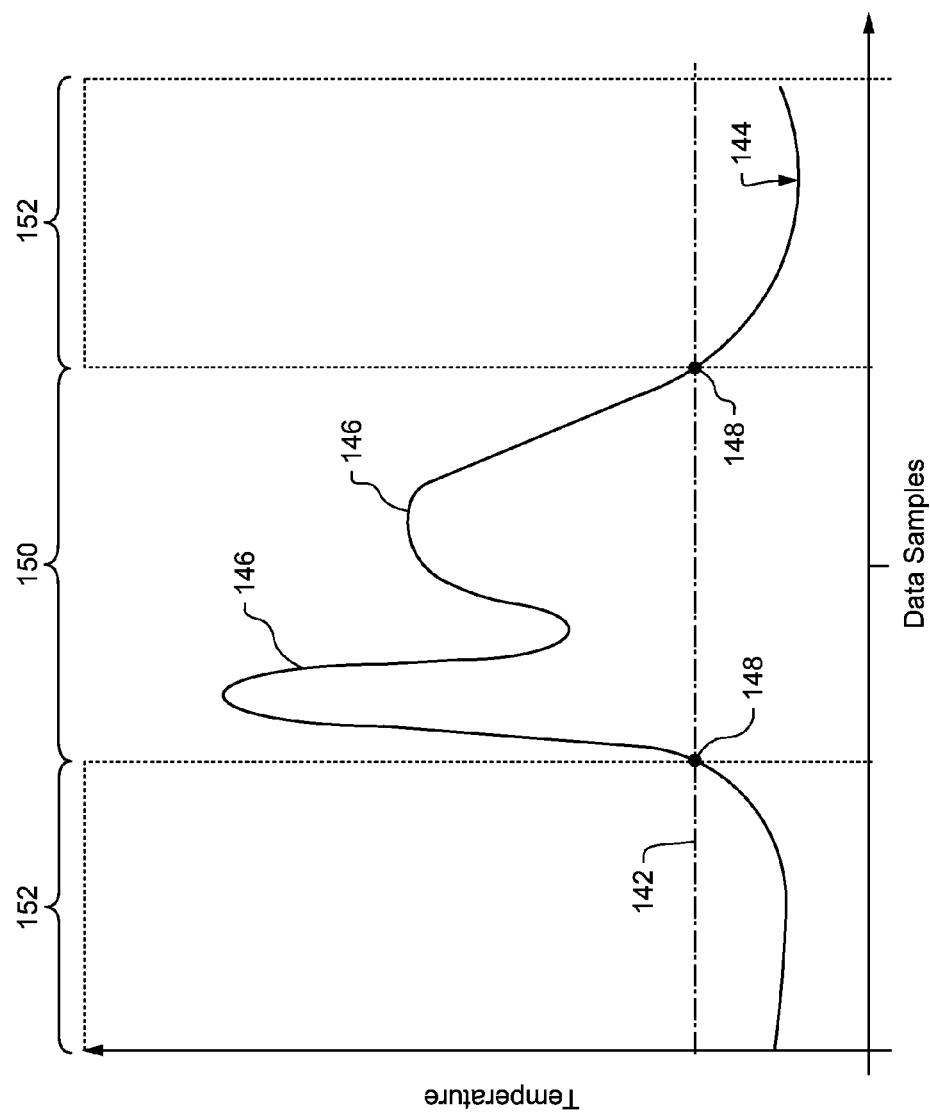
FIG. 3 is a graphical illustration of an exemplary set of IR data corresponding to IR signals received of the present disclosure.

While not necessarily drawn to scale and provided for illustrative purposes only, the temperature curve 144 in FIG. 3 may correspond to the temperatures of the undercarriage 106, the axles 116, the wheels 120, and the bearings 122 of a railcar 108 passing over the sensing elements 102. Notably, the temperatures of the moving parts of the railcar 108, such as the axles 116, the wheels 120, and the bearings 122, may exhibit relatively higher temperatures and are shown as spikes 146 along the temperature curve 144. The corresponding endpoints 148 along the temperature curve 144 where the spikes 146 begin and end may denote where the undesired section 150 of IR data begins and ends. Accordingly, the signal processing module 136 may identify or locate the endpoints 148 of the undesired section 150 using one or more thresholds 142 that are predetermined using any combination of techniques. For example, the threshold 142 may be based on a temperature-based upper limit, or the temperature beyond which ambient temperatures rarely exceed for the given conditions. The threshold 142 may alternatively employ limits that are defined based on the rate of change of temperature, or relatively abrupt changes in the slope of the temperature curve 144. Furthermore, the thresholds 142 may be easily adapted for different railcars 108 and/or changing environmental conditions with minimal effort. The rail temperature may be extracted using similar or more simplified processes. More particularly, because the physical location of the rail 104 remains constant relative to the IR sensing elements 102, the portions of line scans or IR data corresponding to the rail 104 may also remain constant. Accordingly, the signal processing module 136 may index or reference those known portions within the IR data to determine the temperature of the rail 104.

With reference again to FIG. 3, once the undesired sections 150 of the IR data have been filtered out, the resulting IR data corresponding to the ambient temperature, or the temperature of the undercarriage 106, may be forwarded to the profile module 138 of FIG. 2. The profile module 138 may be configured to generate a characteristic thermal profile that may be used to identify or determine the ambient temperature, such as based on predetermined relationships between IR signals and undercarriage temperatures. These predetermined relationships may be derived based on correlations between historical or test IR data and known undercarriage temperatures, and may further interrelate different possible sets of undercarriage temperatures with known ambient temperatures. The profile module 138 may similarly be configured to generate a characteristic thermal profile that may be used to identify or determine the rail temperature using predetermined relationships between test IR data and known rail temperatures. Furthermore, the predetermined relationships may be provided in the form of lookup maps, tables, or the like, that are retrievably stored within the memory 128 and/or the database 130, or otherwise accessible to the controller 124. The resulting characteristic thermal profile may then be forwarded to the interface module 140, which may communicate the characteristic thermal profile to one or more of the memory 128, the database 130, and the central monitoring unit 132.

The central monitoring unit 132 of FIG. 1 may be locally or remotely disposed relative to the controller 124, and configured to at least receive communications from the controller 124 directly or indirectly, such as through wired or wireless connections and one or more local or wide area networks. Based on the characteristic thermal profile, the central monitoring unit 132 may further compare one or more of the ambient temperature and the rail temperature to predefined ranges of nominal temperatures to determine whether any temperature thresholds are exceeded. If either the ambient temperature or the rail temperature appears to be too hot or too cold for the current operating speed of the train or railcar 108 or other relevant operating conditions, the central monitoring unit 132 may engage steps to adjust the operating speed accordingly. For example, if the characteristic thermal profile suggests that either of the ambient temperature or rail temperature exceeds an upper temperature limit or falls below a lower temperature limit, the central monitoring unit 132 may generate warnings, notifications, alerts, alarms, or other indications of the event which may allow appropriate personnel to reduce the operating speed of the train or railcars 108 or otherwise respond. In some embodiments, the central monitoring unit 132 may be capable of reducing the operating speed autonomously or semi-autonomously. If the characteristic thermal profile suggests that the ambient temperature and the rail temperature has returned to within ideal temperature ranges, the central monitoring unit 132 may take similar steps to increase or restore normal operating conditions.

While the embodiment of FIG. 2 illustrates one possible way of programming or implementing the controller 124, it will be understood that the tasks performed by the controller 124 and the temperature detection system 100 may be implemented using other modular arrangements to provide comparable results. For example, it is possible to implement the controller 124 using fewer or more modules than shown in FIG. 2. Furthermore, one or more of the roles of each module may be performed by a different module than shown. Still further variations and modifications to the algorithms or methods employed to operate the controller 124 and the temperature detection system 100 disclosed herein will be apparent to those of ordinary skill in the art. One exemplary algorithm or method by which the controller 124 may be operated to detect ambient or rail temperatures is discussed in more detail below.

INDUSTRIAL APPLICABILITY

In general terms, the present disclosure may find applicability in many industries including, but not limited to, temperature detection systems and methods for railways capable of detecting heat radiating from passing trains or railcars. Although applicable to a variety of different temperature-sensitive applications, the present disclosure may be particularly applicable to the railroad industry where ambient temperatures and/or rail temperatures can be used to derive the optimum operating speed of a train or railcar, or used to monitor other operating conditions. The present disclosure generally provides a system that can be implemented using pre-existing IR-based sensors, which may be configured to detect overtemperature conditions in the bearings or wheels of trains, to derive ambient temperatures and rail temperatures. The present disclosure may also be retrofitted or implemented for use with pre-existing IR sensors already installed along a railway, thereby reducing the need for additional infrastructure. Furthermore, by employing IR sensors installed within cross-ties, sleepers or otherwise mounted in close proximity to the rails, the present disclosure overcomes the need for wayside equipment and the drawbacks associated therewith.

Figure 4:
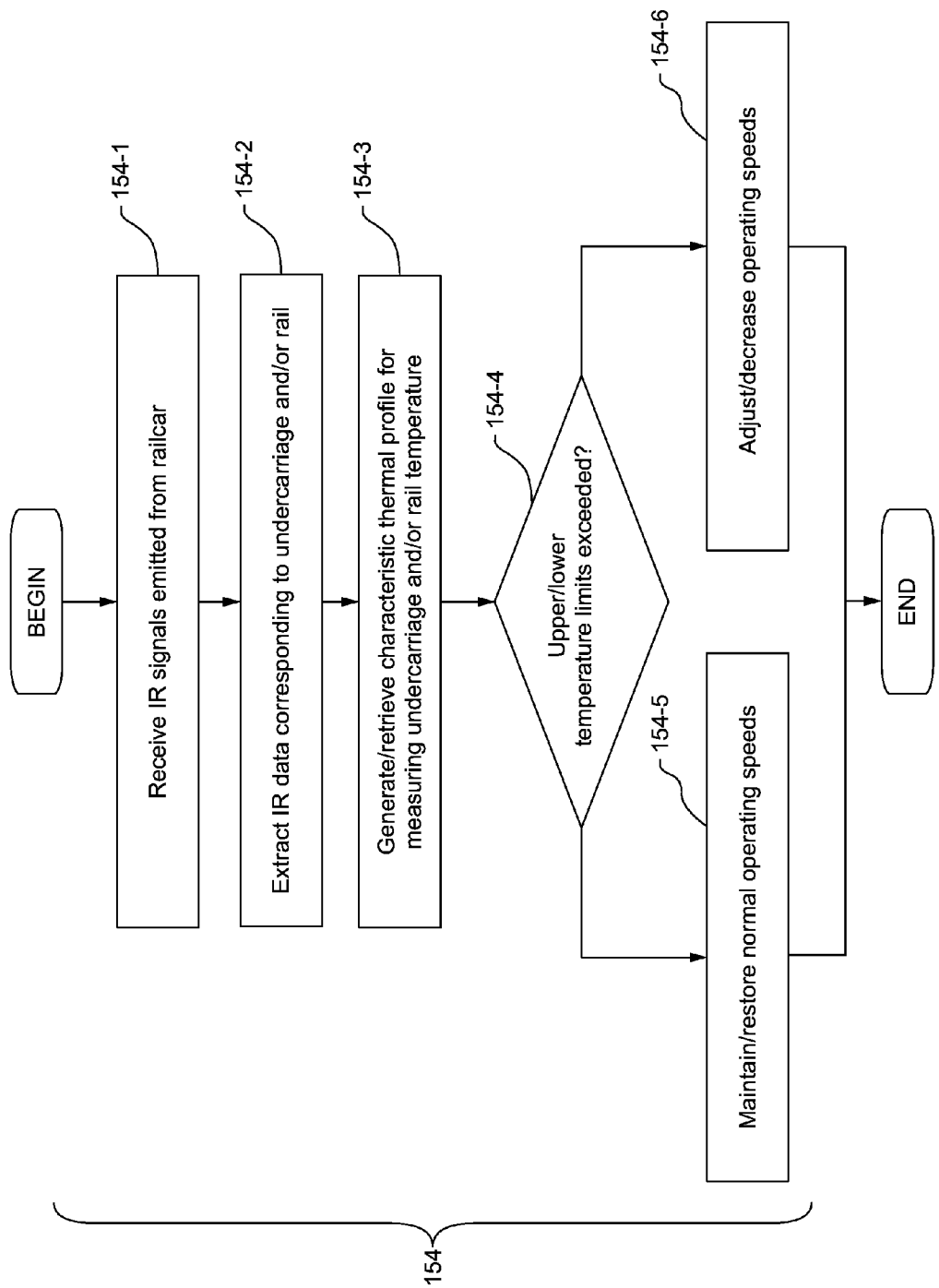
FIG. 4 is a flowchart depicting an exemplary disclosed method that may be performed by a controller of the present disclosure.

One exemplary algorithm or controller-implemented method 154 for operating the temperature detection system 100, or the controller 124 thereof, is diagrammatically provided in FIG. 4. As shown in block 154-1, the controller 124, or a sensor module 134 thereof, may be programmed to initially receive any or all IR signals that are emitted from a passing railcar 108 and received through a given target area 118 thereof. In particular, the IR signals received in block 154-1 may be comprehensive and include IR emissions from the undercarriage 106, the rails 104, the axles 116, the wheels 120, the bearings 122, and any other component underneath the railcar 108 that may pass over the target area 118 or reside within the line of sight of the sensing elements 102. In block 154-2, the controller 124, or a signal processing module 136 thereof, may then extract or isolate IR data corresponding to IR signals emitted from the undercarriage 106, the rail 104, or any other area of the railcar 108 that may be indicative of the ambient temperature or the rail temperature. For example, the controller 124 may compare the comprehensive IR data retrieved in block 154-1 to one or more predefined thresholds 142 as shown in FIG. 3 to filter out the undesired sections 150 of IR data, such as those pertaining to the axles 116, the wheels 120, and the bearings 122 of the railcar 108, which tend to reflect higher temperature readings.

Once IR data of the undercarriage 106 or the rail 104 has been isolated, the controller 124, or a profile module 138 thereof, may generate a characteristic thermal profile to be used to distinguish the ambient temperature or rail temperature in block 154-3 of FIG. 4. A characteristic thermal profile may include an arrangement of data which helps identify boundaries of a target area 118 and provide one or more temperature traits of target objects that can be electronically generated, processed, stored, communicated, or the like. More specifically, the controller 124 may retrieve lookup maps, tables, or the like, from the memory 128 and/or the database 130, which provide predetermined relationships between, for example, different undercarriage IR data sets and corresponding ambient temperatures or thermal profiles thereof. Based on the characteristic thermal profile, the controller 124 in block 154-4 may then be able to determine whether the ambient temperature or rail temperature calls for any adjustment in the operating speed of the train or railcar 108. For example, if the characteristic thermal profile suggests that either the ambient temperature or the rail temperature is either too hot or too cold, the controller 124 may determine that normal operating speeds may be too fast or unsafe for the given conditions, and take measures to adjust and at least temporarily reduce the operating speeds.

If, for example, the ambient temperature and the rail temperature is within normal or acceptable temperature ranges, the controller 124 in block 154-5 of FIG. 4 may deem it unnecessary to make adjustments and allow normal operating speeds of the train or railcar 108 to be maintained, at least until the next iteration of the method 154 is performed and until the next set of IR data is collected. If, however, the ambient temperature or the rail temperature is too hot and exceeds a maximum temperature threshold, or if the ambient temperature or rail temperature is too cold and falls below a minimum temperature threshold, the controller 124 in block 154-6 may take steps to adjust or reduce the operating speed of the train or railcar 108 as a precaution. In some embodiments, for example, the controller 124 may inform the appropriate personnel, such as via the central monitoring unit 132, to reduce the operating speed or to take steps to effectively reduce the operating speed autonomously. The controller 124 may maintain the adjusted or reduced operating speed until the ambient temperature and the rail temperature return to within an acceptable temperature ranges, at which point the controller 124 may take any necessary steps to restore normal operating speeds as in block 154-5.

Where applicable, the controller 124, or an interface module 140 thereof, may communicate the characteristic thermal profile or other assessments to a central monitoring unit 132, which may perform any one or more of the processes of the method 154 of FIG. 4. For example, the controller 124 may communicate the IR data and/or the characteristic thermal profiles directly or indirectly to a central monitoring unit 132 that is locally or remotely situated relative to the controller 124, such as via wired or wireless connections and one or more local or wide area networks. Furthermore, the central monitoring unit 132 may be used to aid the controller 124 in carrying out any adjustments to the operating speeds of the train or railcar 108. In some embodiments, for example, the central monitoring unit 132 may be configured to take any necessary steps to autonomously adjust the operating speeds based on the characteristic thermal profiles generated by the controller 124. In other embodiments, the central monitoring unit 132 may be configured to generate notifications, alerts, alarms, or the like, to indicate to the appropriate operators of any excessively high or low ambient temperatures or rail temperatures which may require the operating speed of the train or railcars 108 to be adjusted or reduced.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A system for detecting temperature, comprising:
at least one infrared (IR) sensing element configured to detect IR signals emitted by a rail; and
a controller in communication with the at least one IR sensing element, the controller being configured to receive the IR signals from the at least one IR sensing element, extract IR data corresponding to the rail from the IR signals, and generate a characteristic thermal profile of a rail temperature based on the IR data, wherein the IR data is extracted by filtering out the IR signals corresponding to wheels, bearings, and axles of the railcar.

2. The system of claim 1, wherein the at least one IR sensing element is disposed along a sleeper and configured to detect IR signals emitted from one or more of rails, wheels, bearings, axles, and the undercarriage of the railcar.

3. The system of claim 1, wherein the IR data is provided in the form of a thermal image including lines of scanned data, and the controller is configured to identify the rail and the rail temperature based on relationships between predefined line locations and temperatures associated with the line locations.

4. The system of claim 1, wherein the controller is configured to retrievably store the characteristic thermal profile in one of a memory and a database for reference.

5. A system for detecting temperature, comprising:
at least one infrared (IR) sensing element configured to detect IR signals emitted by a railcar; and
a controller in communication with the at least one IR sensing element, the controller being configured to receive the IR signals from the at least one IR sensing element, extract IR data corresponding to an undercarriage of the railcar from the IR signals, and generate a characteristic thermal profile of an ambient temperature based on the IR data, wherein the IR data is extracted by filtering out the IR signals corresponding to wheels, bearings, and axles of the railcar.

6. The system of claim 5, wherein the controller is configured to generate the characteristic thermal profile based on predetermined relationships between at least IR signals and undercarriage temperatures.

7. A controller for detecting temperature, comprising:
a sensor module configured to receive one or more infrared (IR) signals emitted by at least one of a railcar and a rail using at least one IR sensing element;
a signal processing module configured to extract IR data corresponding to at least one of the rail and an undercarriage of the railcar from the IR signals; and
a profile module configured to generate a characteristic thermal profile of at least one of an ambient temperature and a rail temperature based on the IR data,
wherein the signal processing module is configured to extract the IR data by filtering out the IR signals corresponding to wheels, bearings, and axles of the railcar.

8. The controller of claim 7, wherein the sensor module is configured to receive IR signals emitted from any one or more of rails, wheels, bearings, axles, and the undercarriage of the railcar.

9. The controller of claim 7, wherein the signal processing module is configured to filter out the IR signals corresponding to the wheels, the bearings, and the axles based on a predetermined threshold.

10. The controller of claim 7, wherein the profile module is configured to generate the characteristic thermal profile based on predetermined relationships between at least IR signals and undercarriage temperatures.

11. The controller of claim 7, further comprising an interface module configured to communicate the characteristic thermal profile to one or more of a memory, a database, and a central monitoring unit associated with the controller.

12. A controller-implemented method for detecting temperature, comprising:
receiving, at one or more infrared (IR) sensing elements, one or more IR signals emitted by at least one of a rail and a railcar;
extracting IR data corresponding to at least one of the rail and an undercarriage of the railcar from the IR signals; and
generating a characteristic thermal profile of at least one of an ambient temperature and a rail temperature based on the IR data,
wherein the IR data is extracted by filtering out the IR signals corresponding to wheels, bearings, and axles of the railcar.

13. The controller-implemented method of claim 12, wherein the one or more IR sensing elements are disposed along a sleeper and configured to detect IR signals emitted from at least one of the rail and the undercarriage.

14. The controller-implemented method of claim 12, wherein the railcar includes at least wheels, bearings, axles, and the undercarriage, the received IR signals including IR signals emitted from one or more of the rails, the wheels, the bearings, the axles, and the undercarriage of the railcar.

15. The controller-implemented method of claim 12, wherein the IR signals corresponding to the wheels, the bearings, and the axles are filtered out based on a predetermined threshold.

16. The controller-implemented method of claim 12, wherein the characteristic thermal profile is generated based on predetermined relationships between at least IR signals and undercarriage temperatures.

17. The controller-implemented method of claim 12, wherein the characteristic thermal profile is retrievably stored in one of a memory and a database for reference.

18. The controller-implemented method of claim 12, wherein the characteristic thermal profile is communicated to a central monitoring unit.

* * * * *